C. BODE.
SUPPORT FOR WELDING BLANKS OF BIFOCAL LENSES.
APPLICATION FILED APR. 3, 1913.

1,126,365.

Patented Jan. 26, 1915.

WITNESSES:
Harry A. Beins
Peter J. Bode

INVENTOR.
Charles Bode.
BY
ATTORNEY.

UNITED STATES PATENT OFFICE.

CHARLES BODE, OF ST. LOUIS, MISSOURI, ASSIGNOR TO HIMSELF AND A. S. ALOE INSTRUMENT COMPANY, OF ST. LOUIS, MISSOURI, A CORPORATION OF MISSOURI.

SUPPORT FOR WELDING BLANKS OF BIFOCAL LENSES.

1,126,365. Specification of Letters Patent. Patented Jan. 26, 1915.

Application filed April 3, 1913. Serial No. 758,648.

*To all whom it may concern:*

Be it known that I, CHARLES BODE, citizen of the United States, residing at St. Louis, State of Missouri, have invented certain new and useful Improvements in Supports for Welding Blanks of Bifocal Lenses, of which the following is a full, clear, and exact description, reference being had to the accompanying drawings, forming a part hereof.

My invention has relation to improvements in supports for welding blanks of bifocal lenses; and it consists in the novel details of construction more fully set forth in the specification and pointed out in the claims.

Figure 1:
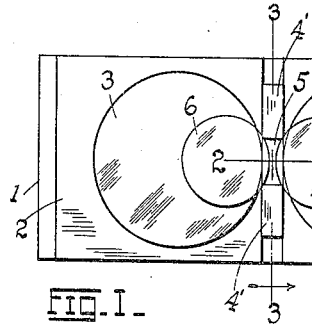
Figure 2:
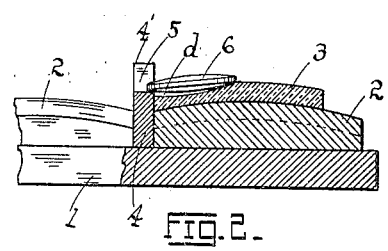
Figure 3:
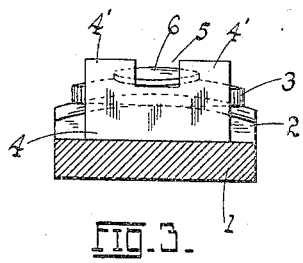
Figure 4:
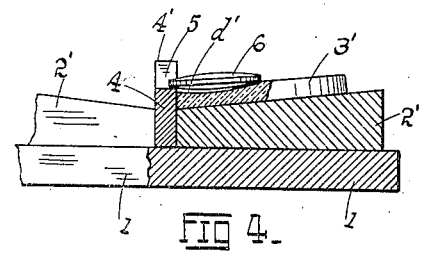
Figure 5:
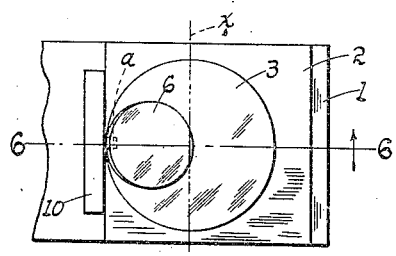
Figure 6:
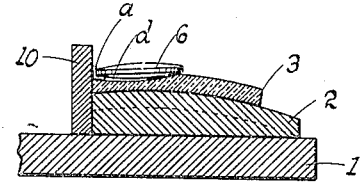

In the drawings, Figure 1 is a top plan of one form of blank support made according to my invention; Fig. 2 is a longitudinal vertical half-section on the line 2—2 of Fig. 1; Fig. 3 is a vertical transverse section on the line 3—3 of Fig. 1; Fig. 4 is a section similar to Fig. 2 showing a support applied to a flat lens blank; Fig. 5 is a plan showing the old form of support; and Fig. 6 is a vertical longitudinal half section on the line 6—6 of Fig. 5.

The object of my invention is to provide a support for blanks of bifocal lenses while in the process of welding, with a view of overcoming the objections inherent in the old form of support to which special reference will presently be made. With the use of my improvement there is no lateral displacement of the flint or reading lens blank during the welding thereof to the plate constituting the distance or crown lens blank; there is absolutely no danger of the occlusion of air bubbles between the blanks; the segments fuse and weld evenly; the reading lens blank maintains its position below the center of the distance lens so that a minimum amount of grinding is required after the conclusion of the welding operation; the device is easy to handle, saves time, prevents waste, and possesses further and other advantages better apparent from a detailed description of the invention which is as follows:—

Referring to the drawings, and for the present to Figs. 1 to 3 inclusive, 1 represents a suitable base or mounting provided with two carborundum (or equivalent) platforms 2, 2, spaced apart, the upper surfaces of the platforms being outwardly convexed to form suitable supports for a "Toric" or curved lens blank 3, which is intended to constitute the distance or crown lens blank as well understood in the art. Between the platforms 2, 2, is a spacing wall or abutment 4 provided with a central U-shaped recess 5. Positioned above the upper dish-shaped portion or depression $d$ is the reading lens blank or flint lens blank 6, the outer edge of said blank being supported on the bottom wall of the recess 5, the said blank entering the recess a sufficient distance to cause the side vertical walls thereof to bear against the edges of the blank from opposite sides, and thereby prevent lateral displacement of the blank during the welding operation or the handling of the support. The edge of the blank 6 supported by the abutment 4 is raised entirely off the surface of the depression $d$, so that when the blank 6 settles into the depression during the fusing and welding operation, such settling will progress from the inner edge supported diametrically opposite the recess 5 toward the edge supported by the abutment 4, and in such settling will gradually force out the air between the two blanks, and when the fusion and welding is complete no air will be occluded between the lenses, and a perfect product thereby results.

It will be seen (Fig. 1) that the portion of the blank 6 supported by the abutment 4 is engaged only at the bottom and sides, there being nothing to bear against the edge of the blank at a point diametrically opposite the inner point of support on the blank 3. In other words no pressure is brought against the periphery of that segment of the blank 6 which is directly supported by the abutment 4 between the vertical walls of the recess 5, so that no pressure will tend to drive the blank 6 toward the center of the member 3 during the welding operation. In that way, the blank 6 will remain permanently below the axis $x$ of the blank 3, a position which it is desired it shall maintain and does maintain in the bifocal product. During the welding of the blanks, it is of course, desirable that there be no shifting or displacement of the blank 3 away from the abutment 4. In the form just described this creeping or shifting is prevented by the convexity of the supporting surface of the platform 2, the blank 6 on the other hand, by virtue of the manner of its support, independently seeking or hugging the member 4, so that the improved mounting or support insures against undesirable displacement of both blanks.

Where a flat blank is to be supported in contradistinction to a Toric lens such as 3, I provide a platform 2' having an upper plane face inclining toward the abutment 4, the blank 3' as shown in the modification in Fig. 4 hugging the abutment 4 by reason of the inclination of the face of its supporting platform. In other respects the balance of the support is the same as that already described, that is to say the reading lens blank 6 is supported over the depression d' of the flat distance lens blank 3' by having an edge resting on said blank 3', an opposite segment of the blank 6 resting on the abutment between the side walls or wings of the recess 5.

In the present embodiment of my invention the block or abutment 4 has a recess 5 formed therein so as to leave a limiting wall or wing 4' on either side of the recess; but the specific construction illustrated need not be adhered to, as any equivalent means of preventing lateral displacement of the reading lens blank 6 when once supported, falls within the spirit of my invention.

It was stated above that one of the objects of the invention was to prevent not only lateral displacement of the reading lens blank, but to prevent the crowding of said blank toward or across the center of the distance lens blank 3 (3') during the welding process. By the old method as illustrated in Figs. 5 and 6, the reading lens blank was supported at its inner edge by a "steel" or angle a which was interposed between the blank and the abutment or block 10, the remaining portions being as already described. It will be seen that with this arrangement not only was there danger of the reading lens blank being displaced or shifted laterally while the support was being deposited in the heating oven, but owing to the placing of the steel a on the surface of the distance lens blank, the reading lens blank, necessarily, extends up to or past the center of the distance lens blank, that is to say, past the line x. These two objections are overcome by my new supporting means, in which the outer supported segment of the reading lens blank 6 overhangs or overlaps the edge of the distance lens 3 (3') thus bringing the inner edge of the member 6 below the line x, a position which it necessarily must occupy in the finished bifocal. With my improvement therefore there is no necessity of grinding away the portion of the reading lens blank overlapping the center of the distance lens blank as no such overlap occurs in practice. It is avoided when the blanks are first superposed; and it is prevented by the peculiar character of the support, the latter holding the blank 6 against movement by means of the segment resting on the abutment 4 between the wings 4', 4', (or in the recess 5). The arc of the segment supported by the abutment 4 may be defined by that portion of the edge of the blank 6 between the corners of the abutments 4', 4', against which the blank bears, the chord of the segment being represented by the edge of the bottom of the recess 5 facing the blank. This is quite obvious from an inspection of Fig. 1 of the drawings. In Fig. 5 on the other hand, this segment disappears altogther as the entire blank 6 is superposed over the member 3.

By reason of the fact that my support enables the reading lens to be positioned below the center of the distance lens, (in practice the distance between the edge of the reading lens and the center of the distance lens is about 2 mm.) and prevents lateral shifting of the reading lens, it is only necessary to grind the welded lenses to the proper curve to get the finished bifocal product. It will thus be seen that by my invention we eliminate (save in exceptional cases) the intermediate step between the welding and grinding of the lenses, namely, that of trimming the bifocal or cutting it down, by aid of a pattern, in order to secure the proper relation between the two lenses. If trimming is not resorted to under the old method, an excessive amount of grinding is necessary, as mentioned above.

Having described my invention, what I claim is:—

1. In a support for bifocal lenses, means for supporting a portion of the reading lens blank overlapping the distance lens blank, and means coöperating with said supporting means for preventing lateral displacement of the reading lens blank.

2. In a support for bifocal lenses, a suitable platform for the support of the distance lens blank, a member positioned adjacent the platform and serving as an abutment for said distance lens blank, and operating to support a portion of the reading lens blank resting on the distance lens blank.

3. In a support for bifocal lenses, a suitable platform for the support of the distance lens blank, a member positioned adjacent the platform and serving as an abutment for said blank, means on the abutment for supporting a portion of the reading lens blank resting on the distance lens blank, and means on the abutment for preventing lateral displacement of the reading lens blank.

4. In a support for bifocal lenses, a suitable base, a platform thereon for the support of the distance lens blank, an abutment or block mounted on the base and bearing against the platform and projecting above the same, said abutment operating to support a portion of the reading lens blank resting on the distance lens blank and maintaining the blanks apart at a point adjacent the abutment, and means on the abutment for preventing lateral displacement of the reading lens blank.

5. In a support for bifocal lenses, a reading lens blank support comprising a block provided with a recess having walls engaging the edges of the reading lens blank.

6. In a support for the blanks of bifocal lenses, a member for supporting the distance lens blank, a second member positioned adjacent to the first member for supporting a reading lens blank resting on the distance lens blank, and means on said second member for preventing lateral displacement of the reading lens blank when so supported.

7. In a support for the blanks of bifocal lenses, a member for supporting the distance lens blank, a second member positioned adjacent thereto and provided with an upper recess, the base of the recess forming a support for the reading lens blank resting on the distance lens blank, the side walls of the recess engaging the edges of the reading lens blank and preventing lateral displacement thereof while thus supported.

8. In a support for the blanks of bifocal lenses, a member for supporting the distance lens-blank, and a member positioned adjacent to the first member for supporting at fixed points a reading lens-blank resting at other points on the distance lens-blank, and operating to maintain the portions of the reading lens-blank supported by the second member out of contact with the distance lens-blank.

9. In a support for the blanks of bifocal lenses, a member for supporting the distance lens-blank, a second member positioned adjacent to the first member for supporting at fixed points a reading lens-blank resting at other points on the distance lens-blank and operating to maintain the portions of the reading lens-blank supported by said second member out of contact with the distance lens-blank, and means on said second member for preventing lateral displacement of the reading lens-blank while so supported.

10. In a support for the blanks of bifocal lenses, a member for supporting the distance lens-blank, a second member positioned adjacent thereto and provided with an upper recess, the base of the recess being relatively positioned to support a portion of the reading lens-blank and hold the same out of contact with the distance lens-blank supporting another portion of the reading lens-blank, the side walls of the recess engaging the edges of the reading lens-blank and preventing lateral displacement thereof while thus supported.

In testimony whereof I affix my signature, in presence of two witnesses.

CHARLES BODE.

Witnesses:
 EMIL STAREK,
 PETER J. BODE.